US011892852B2

(12) United States Patent
Yuguchi

(10) Patent No.: US 11,892,852 B2
(45) Date of Patent: Feb. 6, 2024

(54) INFORMATION PROCESSING APPARATUS AND INFORMATION PROCESSING METHOD

(71) Applicant: SONY GROUP CORPORATION, Tokyo (JP)

(72) Inventor: Yudai Yuguchi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 47 days.

(21) Appl. No.: 17/637,009

(22) PCT Filed: Aug. 11, 2020

(86) PCT No.: PCT/JP2020/030581
§ 371 (c)(1),
(2) Date: Feb. 21, 2022

(87) PCT Pub. No.: WO2021/039378
PCT Pub. Date: Mar. 4, 2021

(65) Prior Publication Data
US 2022/0357749 A1 Nov. 10, 2022

(30) Foreign Application Priority Data
Aug. 29, 2019 (JP) ................................. 2019-156266

(51) Int. Cl.
*G05D 1/02* (2020.01)
(52) U.S. Cl.
CPC ... *G05D 1/0223* (2013.01); *G05D 2201/0217* (2013.01)
(58) Field of Classification Search
CPC .................. G05D 1/0223; G05D 2201/0217
See application file for complete search history.

(56) References Cited

U.S. PATENT DOCUMENTS

2004/0028260 A1* 2/2004 Higaki ................ G06V 40/20
382/199
2005/0228540 A1* 10/2005 Moridaira ............ A63H 11/00
700/245
(Continued)

FOREIGN PATENT DOCUMENTS

CA       2774163 A1    3/2011
CN     107209024 A     9/2017
(Continued)

OTHER PUBLICATIONS

Written Opinion of the International Search Authority for PCT/JP2020/030581 (English translation) (Year: 2020).*
(Continued)

*Primary Examiner* — Calvin Cheung
(74) *Attorney, Agent, or Firm* — CHIP LAW GROUP

(57) ABSTRACT

An information processing apparatus, an information processing method, and a program that allow smooth movement of a mobile body. The information processing apparatus includes a position information acquisition unit, a posture information acquisition unit, a generation unit, and a mobile body controller. The position information acquisition unit acquires position information of a mobile body. The posture information acquisition unit acquires posture information of the mobile body. The generation unit generates a target trajectory to a target point, the target trajectory including a plurality of waypoints each including waypoint information including a position command value and a posture command value for the mobile body. The mobile body controller extracts waypoints existing within a threshold distance from the mobile body using the position information and the position command value, selects a waypoint having a smallest difference between the posture command value, and sets the waypoint as a reference point.

17 Claims, 9 Drawing Sheets

(56) References Cited

U.S. PATENT DOCUMENTS

| | | | | |
|---|---|---|---|---|
| 2008/0300745 | A1* | 12/2008 | Goossen | G05D 1/0044 |
| | | | | 701/25 |
| 2012/0179322 | A1 | 7/2012 | Hennessy et al. | |
| 2017/0060137 | A1 | 3/2017 | Shitamoto | |
| 2017/0344025 | A1* | 11/2017 | Nakano | G05D 1/024 |
| 2019/0088143 | A1 | 3/2019 | Deker et al. | |

FOREIGN PATENT DOCUMENTS

| | | |
|---|---|---|
| EP | 3112968 A1 | 1/2017 |
| FR | 3031175 A1 | 7/2016 |
| JP | 2-56006 A | 2/1990 |
| JP | 2014-219799 A | 11/2014 |
| JP | 2015-158844 A | 9/2015 |
| JP | 2016-081404 A | 5/2016 |
| WO | 2011/032208 A1 | 3/2011 |
| WO | 2014/181647 A1 | 11/2014 |
| WO | 2015/129425 A1 | 9/2015 |
| WO | 2016/107853 A2 | 7/2016 |

OTHER PUBLICATIONS

JP 2013025351 A with English translation (Year: 2013).*
International Search Report and Written Opinion of PCT Application No. PCT/JP2020/030581, dated Nov. 2, 2020, 10 pages of ISRWO.

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2020/030581 filed on Aug. 11, 2020, which claims priority benefit of Japanese Patent Application No. JP 2019-156266 filed in the Japan Patent Office on Aug. 29, 2019. Each of the above-referenced applications is hereby incorporated herein by reference in its entirety.

TECHNICAL FIELD

The present technology relates to an information processing apparatus, an information processing method, and a program relating to control of a mobile body such as an autonomously acting robot.

BACKGROUND ART

Patent Literature 1 describes an autonomous mobile device including an arithmetic unit that generates a moving path using a landmark object without requiring manual setting of a waypoint.

In such an autonomous mobile device, the movement thereof is generally controlled on the basis of the moving path in which a speed and a position are set in advance according to the time.

CITATION LIST

Patent Literature

Patent Literature 1: Japanese Patent Application Laid-open No. 2016-81404

DISCLOSURE OF INVENTION

Technical Problem

A mobile body that runs on the basis of a generated moving path is requested to smoothly move.

The present disclosure provides an information processing apparatus, an information processing method, and a program that allow smooth movement of a mobile body.

Solution to Problem

An information processing apparatus according to an embodiment of the present technology includes a position information acquisition unit, a posture information acquisition unit, a generation unit, and a mobile body controller.

The position information acquisition unit acquires position information of a mobile body.

The posture information acquisition unit acquires posture information of the mobile body.

The generation unit generates a target trajectory to a target point, the target trajectory including a plurality of waypoints each including waypoint information including a position command value and a posture command value for the mobile body.

The mobile body controller extracts, from the plurality of waypoints, waypoints existing within a threshold distance from the mobile body using the position information and the position command value, selects, from the extracted waypoints, a waypoint having a smallest difference between the posture command value of the waypoint and the posture information, and sets the waypoint as a reference point.

With such a configuration, the reference point can be set using the position and posture information of the mobile body.

The threshold distance may be set using at least one of information of the target trajectory, speed information, shape information, or size information of the mobile body.

The mobile body controller may control movement of the mobile body using the waypoint information of the waypoint set as the reference point.

The waypoint information may include a speed command value including at least one of a translational speed command value or an angular speed command value, and the mobile body controller may control the movement of the mobile body using the speed command value of the waypoint set as the reference point.

The mobile body controller may control the movement of the mobile body in consideration of an error amount between the position information or the posture information and the position command value or the posture command value of the waypoint set as the reference point.

The generation unit may regenerate the target trajectory when the error amount exceeds a threshold value.

The mobile body controller may control the movement of the mobile body using a speed command value of a waypoint located ahead of the reference point if the speed command value of the waypoint set as the reference point is a dead band speed.

The mobile body controller may change the speed command value of the waypoint set as the reference point on the basis of a result of comparing the speed command value of the waypoint set as the reference point and a speed command value of a subsequent waypoint.

The mobile body controller may change the speed command value of the waypoint set as the reference point to a speed command value larger than the dead band speed if the speed command value of the subsequent waypoint is larger than the speed command value of the waypoint set as the reference point.

The mobile body controller may change the speed command value of the waypoint set as the reference point to zero if the speed command value of the subsequent waypoint is smaller than the speed command value of the waypoint set as the reference point.

The mobile body controller may sequentially compare, if the speed command value of the waypoint set as the reference point is identical to the speed command value of the subsequent waypoint, two adjacent waypoints to be compared by shifting the two adjacent waypoints one by one to subsequent waypoints until speed command values of the respective two adjacent waypoints to be compared differ from each other.

The mobile body controller may change the speed command value of the waypoint set as the reference point to zero if a speed command value of a preceding waypoint is larger than a speed command value of a subsequent waypoint in the two adjacent waypoints to be compared as a result of the sequential comparison.

The mobile body controller may change the speed command value of the waypoint set as the reference point to a speed command value larger than the dead band speed if a speed command value of a preceding waypoint is smaller than a speed command value of a subsequent waypoint in the two adjacent waypoints to be compared as a result of the sequential comparison.

The mobile body controller may change the speed command value of the waypoint set as the reference point to zero if the speed command values of the two adjacent waypoints are constantly identical to each other as a result of the sequential comparison performed to a predetermined waypoint.

The waypoint information may include a target passing time at which the mobile body passes through a waypoint, and the mobile body controller may set, as a new reference point, a waypoint having a target passing time that is closest to a sum of a target passing time of the waypoint set as the reference point and a response time for the speed command value of the mobile body.

The mobile body may include the position information acquisition unit, the posture information acquisition unit, the generation unit, and the mobile body controller.

An information processing method according to an embodiment of the present technology includes: acquiring position information of a mobile body; acquiring posture information of the mobile body; generating a target trajectory including a plurality of waypoints each including waypoint information including a position command value and a posture command value for the mobile body; and extracting, from the plurality of waypoints, waypoints existing within a threshold distance from the mobile body using the position information and the position command value, selecting, from the extracted waypoints, a waypoint having a smallest difference between the posture command value of the waypoint and the posture information, and setting the waypoint as a reference point.

A program according to an embodiment of the present technology causes an information processing apparatus to execute processing including the steps of: acquiring position information of a mobile body; acquiring posture information of the mobile body; generating a target trajectory including a plurality of waypoints each including waypoint information including a position command value and a posture command value for the mobile body; and extracting, from the plurality of waypoints, waypoints existing within a threshold distance from the mobile body using the position information and the position command value, selecting, from the extracted waypoints, a waypoint having a smallest difference between the posture command value of the waypoint and the posture information, and setting the waypoint as a reference point.

Mode(s) for Carrying Out the Invention

MODE(S) FOR CARRYING OUT THE INVENTION

Configuration of Mobile Body

An information processing apparatus according to an embodiment of the present technology will be described with reference to FIG. 1. In this embodiment, a mobile body capable of autonomously moving on a ground surface such as a road surface or a floor surface will be described as an example.

Figure 1:
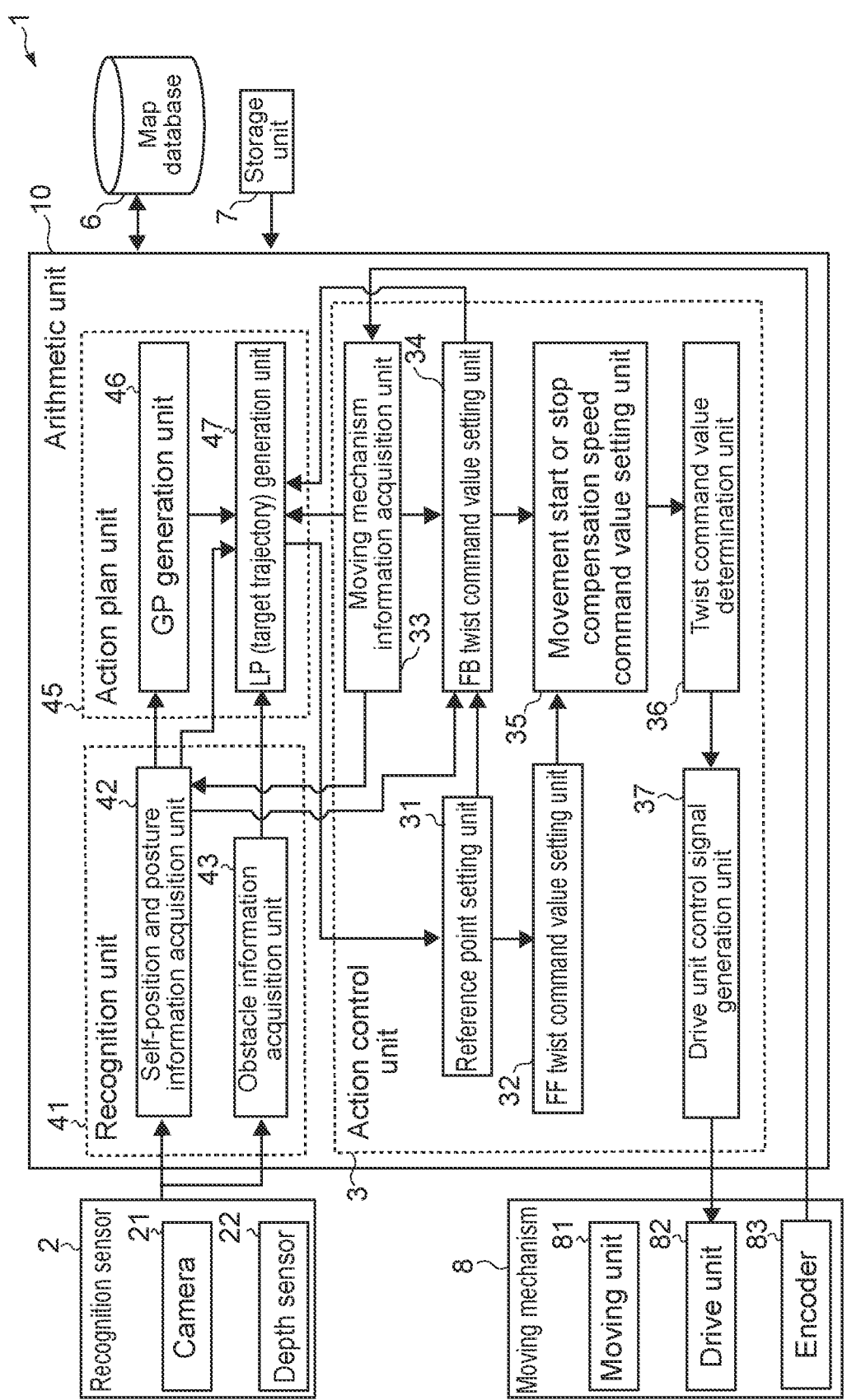
FIG. 1 is a block diagram showing a configuration of a mobile body as an information processing apparatus according to an embodiment of the present technology.

FIG. 1 is a block diagram showing a configuration of a mobile body as an information processing apparatus.

As shown in FIG. 1, a mobile body 1 serving as an information processing apparatus includes an arithmetic unit 10, a recognition sensor 2, a moving mechanism 8, a map database 6, and a storage unit 7.

The arithmetic unit 10 performs a series of information processing relating to the control of the movement of the mobile body 1. Hereinafter, the control of the movement of the mobile body 1 will be referred to as "action control". The arithmetic unit 10 includes a recognition unit 41, an action plan unit 45, and an action control unit 3 serving as a mobile body controller.

The recognition unit 41 recognizes information of the mobile body 1 and obstacle information around the mobile body 1. More specifically, the recognition unit 41 acquires a self-position and a posture of the mobile body 1 and the obstacle information around the mobile body 1 using sensing results obtained from the recognition sensor 2.

The action plan unit 45 generates a global path (GP) using the self-position and posture information of the mobile body 1 acquired by the recognition unit 41 and a map stored in the map database 6. Further, the action plan unit 45 generates a target trajectory (local path) that is a target moving path of the mobile body 1 using the global path and the obstacle information acquired by the recognition unit 41.

The action control unit 3 controls the movement of the mobile body 1 using the generated target trajectory.

Details of the arithmetic unit 10 will be described later.

Figure 2:
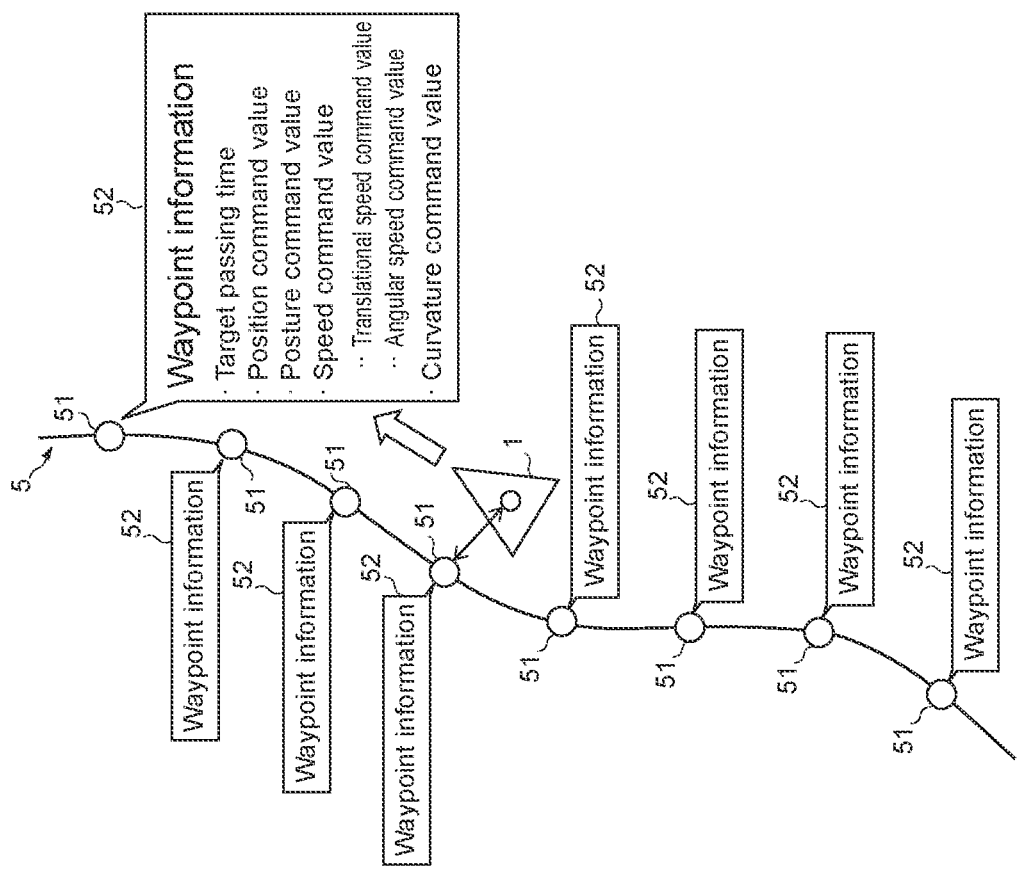
FIG. 2 is a schematic diagram showing an example of a target trajectory of the mobile body.

FIG. 2 is a schematic diagram showing an example of a target trajectory 5 of the mobile body 1 generated by the arithmetic unit 10.

The target trajectory 5 includes a plurality of waypoints 51. The target trajectory 5 includes a target trajectory generation time and waypoint information 52 of each of the plurality of waypoints 51. The waypoint information 52 of each waypoint 51 is different from each other. The distance between the adjacent waypoints 51 is appropriately set on the basis of the size, shape, speed, or the like of the mobile body 1.

The waypoint information 52 includes information relating to the movement of the mobile body 1 at the waypoint 51. The waypoint information 52 includes a target passing time of the waypoint, a position command value of the waypoint, a posture command value at the waypoint, a speed command value at the waypoint, and a target curvature at the waypoint.

The speed command value includes at least one of a translational speed command value or an angular speed command value, and in this embodiment, both of them.

The translational speed command value is a translational speed that is a target of the mobile body 1 at the waypoint. The angular speed command value command value is an angular speed that is a target of the mobile body 1 at the time when the mobile body 1 at the waypoint changes the traveling direction to the clockwise or counterclockwise direction with reference to the traveling direction.

Hereinafter, a combination of the translational speed command value and the angular speed command value will be referred to as a twist command value.

In this embodiment, when controlling the movement of the mobile body 1 using the target trajectory 5, the arithmetic unit 10 selects a reference point from a plurality of waypoints, generates a control signal of the moving mechanism 8 using a twist command value of the waypoint set as the reference point, and controls the movement of the mobile body 1. Details of the action control of the mobile body 1 will be described later.

The recognition sensor 2 includes, for example, a camera 21 and a depth sensor 22 serving as an image acquisition unit.

The camera 21 is an imaging device for imaging the periphery of the mobile body 1. As the camera 21, a variety of imaging devices such as an RGB camera, a monochrome camera, an infrared camera, and a polarization camera may be employed. An RGB image, a monochrome image, an infrared image, a polarization image, and the like are acquired depending on the type of the imaging device. The image information obtained as a result of imaging is supplied to the arithmetic unit 10. A single camera 21 or a plurality of cameras 21 may be provided. The camera 21 is mounted, for example, on the top of the mobile body 1.

The depth sensor 22 acquires distance information from the depth sensor 22 to an object that is present around the mobile body. The acquired three-dimensional distance image information is supplied to the arithmetic unit 10. The depth sensor 22 is mounted, for example, on the top of the mobile body 1.

A well-known depth sensor can be used as the depth sensor 22. For example, a method of applying infrared light or the like and measuring the distance to a target object on the basis of the time when the reflected light of the applied infrared light returns, a method of irradiating a pattern with infrared light or the like and measuring the distance to the target object on the basis of the distortion of the pattern reflected on the target object, or a method of matching the images captured by a stereo camera and measuring the distance to the target object on the basis of the parallax between the images, and the like can be used.

The moving mechanism 8 is moving means for moving the mobile body 1 in a space under the control of the action control unit 3 of the arithmetic unit 10.

The moving mechanism 8 includes a legged moving mechanism, a wheel moving mechanism, an endless track type moving mechanism, a propeller moving mechanism, and the like. The mobile bodies equipped with the legged moving mechanism, the wheel moving mechanism, and the endless track type moving mechanism are movable on the ground. A robot equipped with the propeller moving mechanism is movable by flying in the air.

The moving mechanism 8 includes a moving unit 81 for moving the mobile body 1, a drive unit 82 for driving the moving unit 81, and an encoder 83.

The legged moving mechanism is used, for example, in a human robot, a pet robot, or the like. The legged moving mechanism includes legs as a moving unit, and an actuator as a drive unit for driving the legs.

The wheel moving mechanism includes wheels as a moving unit, and a motor as a drive unit for driving the wheels. The main body of the mobile body 1 is moved on the ground plane by the rotational drive of the wheels attached to the main body of the mobile body 1.

The endless track type moving mechanism includes an endless track as a moving unit and a motor as a drive unit for driving the endless track. The main body of the mobile body 1 is moved on the ground plane by the rotational drive of the endless track attached to the main body of the mobile body 1.

The propeller moving mechanism includes a propeller as a moving unit for moving the mobile body and an engine or battery as a drive unit for driving the propeller.

In this embodiment, a mobile body 1 having a wheel moving mechanism will be described as an example. In this embodiment, the moving unit 81 is wheels, and the drive unit 82 is a motor.

The encoder 83 is provided to the wheels serving as the moving unit 81. A detection value of the encoder 83 is supplied to the arithmetic unit 10.

The map database 6 stores a map representing a static information portion of an area such as an indoor area or an outdoor area where the mobile body 1 moves, and the map can be updated as needed. For example, if the mobile body 1 moves indoors, a map representing information regarding an object, such as the position and shape of a three-dimensional structure including a sofa, a bed, a wall, or the like, is stored. Further, if the mobile body 1 moves outdoors, a map representing information regarding an object, such as the position and shape of a three-dimensional structure including a building or the like, road surface information, lane information, or the like is stored.

A global path is generated on the basis of the map stored in the map database 6, and a target trajectory (local path) is generated using the obstacle information.

In this embodiment, the example in which the map database is constructed in the mobile body 1 as an information processing apparatus has been described, but the map database may be constructed on a cloud server.

The storage unit 7 includes a memory device such as a RAM and a non-volatile recording medium such as a hard disk drive, and stores programs for causing the mobile body 1, which is an information processing apparatus, to execute a series of information processing relating to the action control of the mobile body 1.

Configuration of Arithmetic Unit

As described above, the arithmetic unit 10 performs a series of information processing relating to the action control of the mobile body 1. The arithmetic unit 10 includes the recognition unit 41, the action plan unit 45, and the action control unit 3. The recognition unit 41 includes a self-position and posture information acquisition unit 42 and an obstacle information acquisition unit 43.

The self-position and posture information acquisition unit 42 is a position information acquisition unit that acquires self-position information of the mobile body 1, and is a posture information acquisition unit that acquires posture information of the mobile body 1.

The self-position and posture information acquisition unit 42 constructs a three-dimensional shape of the periphery by integrating the image information acquired by the camera 21 and the three-dimensional distance image information acquired by the depth sensor 22. The map stored in the map database is a map of correct answer data. With reference to the map of correct answer data and the constructed three-dimensional shape, the self-position and posture of the mobile body 1 on which the camera 21 and the depth sensor 22 are mounted are estimated, and the position information and posture information of the mobile body 1 (hereinafter, sometimes referred to as position and posture information) are acquired.

Further, self-position estimation may be performed using the detection value of the encoder 83, which is acquired by a moving mechanism information acquisition unit 33 to be described later, thus acquiring the position information of the mobile body 1. Further, self-position and posture estimation may be performed by combining a received signal from a global positioning system (GPS) or global navigation satellite system (GNSS) (not shown) and an inertial measurement unit (IMU) (not shown), thus acquiring the position and posture information of the mobile body 1. Further, those pieces of sensor information may be integrated to perform self-position estimation with higher accuracy.

The obstacle information acquisition unit 43 acquires obstacle information such as an object or a person around the mobile body 1. The obstacle information acquisition unit 43 detects an object area and a person area using the three-dimensional shape constructed on the basis of, for example, the information acquired by the camera 21 and the depth sensor 22.

For example, a map representing a real space in which a moving object or a person does not exists and only a stationary object exists is registered as correct answer data in advance in the map database 6, and a person area and an object area other than a person can be detected from a background difference between the map of the correct answer data and the constructed three-dimensional shape, and those areas can be acquired as obstacle information.

The action plan unit 45 includes a global path (GP) generation unit 46 and a local path (LP or target trajectory) generation unit 47.

The GP generation unit 46 generates a global path from the current position of the mobile body 1 to the target point on the basis of the position and posture information of the mobile body 1 acquired by the self-position and posture information acquisition unit 42. The target point is input and set by the user, for example.

The target trajectory generation unit 47 generates a target trajectory (local path) 5 serving as a path avoiding an obstacle by using the global path generated by the GP generation unit 46, the obstacle information acquired by the obstacle information acquisition unit 43, the detection value of the encoder 83 acquired by the moving mechanism information acquisition unit 33, and the position and posture information of the mobile body 1 acquired by the self-position and posture information acquisition unit 42.

The action control unit 3 is a mobile body controller that controls the movement of the mobile body 1.

The action control unit 3 controls the movement of the mobile body 1 by using the target trajectory 5 generated by the target trajectory generation unit 47 and the position and posture information acquired by the self-position and posture information acquisition unit 42.

More specifically, a reference point is selected from a plurality of waypoints 51 constituting the target trajectory 5. Subsequently, the movement of the mobile body 1 is controlled using the speed command value held by the waypoint set as the reference point (hereinafter, the waypoint set as the reference point will be sometimes simply referred to as "reference point"), the position command value and the posture command value held by the reference point, and the current position and posture information of the mobile body 1.

As shown in FIG. 1, the action control unit 3 includes a reference point setting unit 31, an FF twist command value setting unit 32, the moving mechanism information acquisition unit 33, an FB twist command value setting unit 34, a movement start or stop compensation speed command value setting unit 35, a twist command value determination unit 36, and a drive unit control signal generation unit 37.

The reference point setting unit 31 extracts waypoints 51 existing within a threshold distance from the mobile body 1, from the plurality of waypoints 51, by using the current position information of the mobile body 1 and the information of the position command value of each waypoint 51. Here, for example, a plurality of waypoints 51 is extracted. Further, the reference point setting unit 31 selects, from the plurality of extracted waypoints 51, a waypoint having the smallest difference between the information of the posture command value of each waypoint 51 and the posture information of the mobile body 1, and sets this waypoint as a reference point.

The FF twist command value setting unit 32 sets a feedforward (FF) twist command value used when the twist command value at the reference point is determined. The FF twist command value includes a set of an FF translational speed command value and an FF angular speed command value.

The FF twist command value is an FF twist command value determined in advance according to a field. The FF twist command value setting unit 32 sets, as the FF twist command value, a twist command value including a set of a translational speed command value and an angular speed command value originally held by the reference point.

The set FF twist command value is output to the movement start or stop compensation speed command value setting unit 35.

The moving mechanism information acquisition unit 33 acquires the detection value of the encoder 83. The detection value includes information such as the moving direction, the amount of movement, and the rotation angle of the mobile body 1.

The FB twist command value setting unit 34 sets a feedback (FB) twist command value using the position information and posture information (hereinafter, sometimes referred to as position and posture information) of the mobile body 1 acquired by the self-position and posture information acquisition unit 42, the detection value of the encoder 83 acquired by the moving mechanism information acquisition unit 33, and the position command value and posture command value of the reference point.

More specifically, the FB twist command value setting unit 34 sets a feedback (FB) twist command value for correcting an error between the position and posture information of the current mobile body 1, and the position command value and posture command value of the reference point. Note that the correction of the error between the information of the mobile body 1 and the command values of the reference point is performed on at least one of the position information or the posture information, and in this embodiment, on both the position information and the posture information. The FB twist command value includes a set of an FB translational speed command value and an FB angular speed command value.

The set FB twist command value is output to the movement start or stop compensation speed command value setting unit 35.

Here, if the error amount between the position and posture information of the current mobile body 1 and the position command value and posture command value of the reference point is equal to or less than a threshold value, as described above, the FB twist command value that is to be a correction value is set so as to cancel the error amount.

On the other hand, if the error amount exceeds the threshold value, that is, if the difference between the current position and posture of the mobile body 1 and the position and posture at the reference point is large, such information is output to the target trajectory generation unit 47, and the target trajectory is regenerated by the target trajectory generation unit 47.

The movement start or stop compensation speed command value setting unit 35 calculates a first twist command value at the reference point using the FF twist command value set by the FF twist command value setting unit 32 and the FB twist command value set by the FB twist command value setting unit 34.

The twist command value calculated using the FF twist command value and the FB twist command value will be referred to as a first twist command value so as to distinguish from the twist command value held by the original waypoint and a final twist command value to be described later.

The first twist command value is a twist command value calculated and changed in twist command value setting processing to be described later. The first twist command value includes a set of a first translational speed command value and a first angular speed command value.

Hereinafter, the speed command value changed in speed command value setting processing to be described later will be referred to as a second translational speed command value and a second angular speed command value.

Furthermore, the movement start or stop compensation speed command value setting unit 35 determines whether each of the first translational speed command value and the first angular speed command value is a dead band speed or not.

The dead band speed indicates a speed that is less than the minimum speed required for the mobile body 1 to start moving, and includes 0 in this case.

Further, if determining that the speed is the dead band speed, the movement start or stop compensation speed command value setting unit 35 compares the translational speed command values (angular speed command values) of the two adjacent waypoints 51 in order to further change the first translational speed command value (first angular speed command value) of the reference point. On the basis of the comparison result, the movement start or stop compensation speed command value setting unit 35 changes and sets the translational speed command value (angular speed command value) of the reference point from the first translational speed command value (first angular speed command value) to the second translational speed command value (second angular speed command value).

The twist command value determination unit 36 determines a twist command value including a set of a final translational speed command value and a final angular speed command value for controlling the movement of the mobile body 1 at the reference point.

If the movement start or stop compensation speed command value setting unit 35 determines that the speed is the dead band speed, the twist command value determination unit 36 determines the final translational speed command value (angular speed command value) at the reference point as a second translational speed command value (second angular speed command value).

On the other hand, if the movement start or stop compensation speed command value setting unit 35 determines that the speed is not the dead band speed, the twist command value determination unit 36 determines the final translational speed command value (angular speed command value) at the reference point as the first translational speed command value (first angular speed command value).

The drive unit control signal generation unit 37 generates a control signal for the drive unit 82 on the basis of the twist command value determined by the twist command value determination unit 36, and outputs the control signal to the drive unit 82.

Information Processing Method

Hereinafter, an information processing method according to the action control of the mobile body 1 will be described.

Outline of Action Control Processing of Mobile Body

Figure 3:
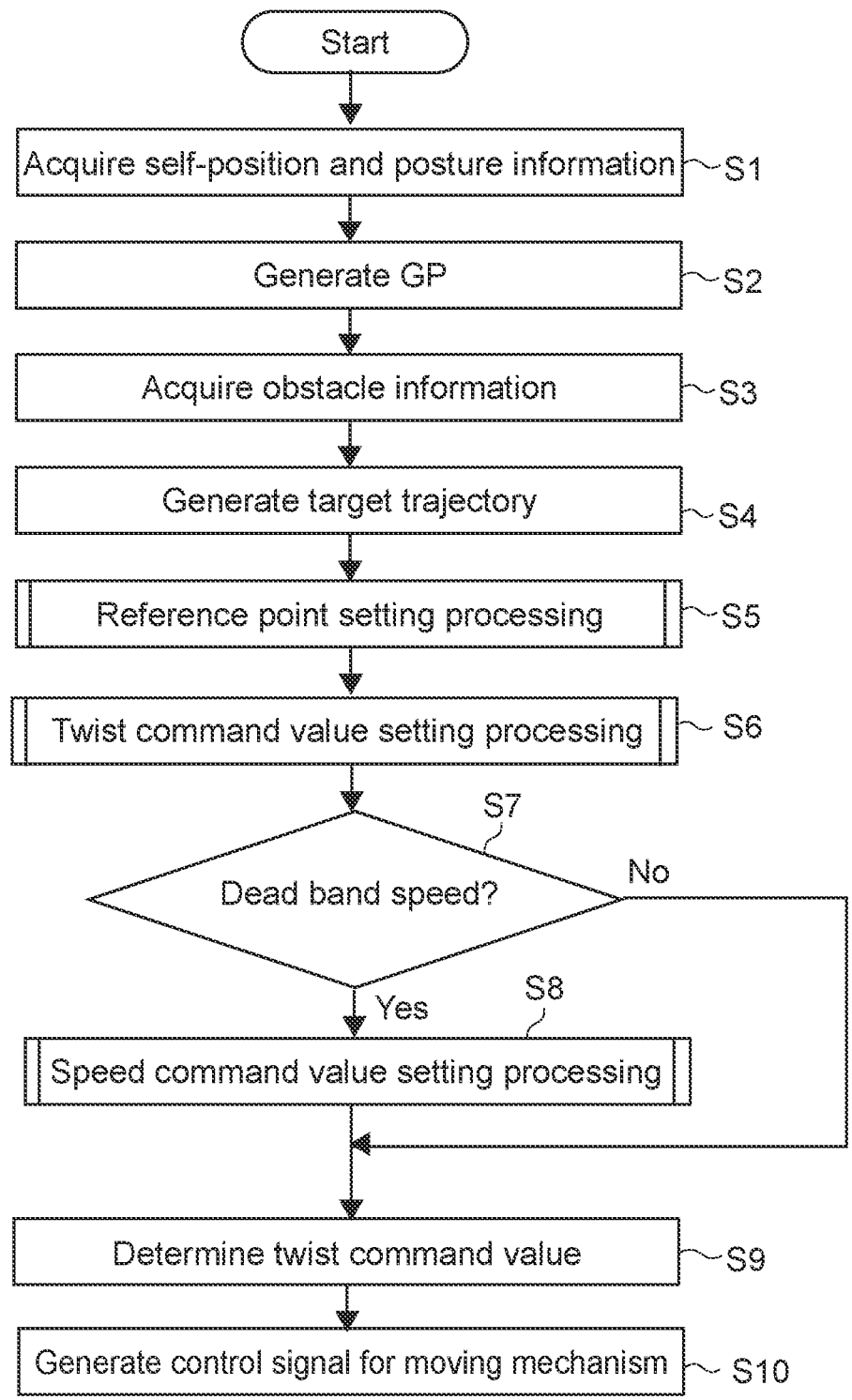
FIG. 3 is a flowchart for describing a method of controlling the movement of the mobile body.

FIG. 3 is a schematic flowchart of an information processing method according to the action control of the mobile body 1.

As shown in FIG. 3, when the processing starts, the self-position and posture information acquisition unit 42 estimates the self-position and posture of the mobile body 1 by using the sensing information acquired by the camera 21, the depth sensor 22, and the encoder 83, to acquire the self-position and posture information (S1).

Next, the GP generation unit 46 generates a global path that is a moving path from a start point to a target point using the position information of the mobile body 1 and the map stored in the map database 6 (S2).

Next, the obstacle information acquisition unit 43 acquires obstacle information such as a person or an object other than a person using the sensing information acquired by the camera 21 and the depth sensor 22 and the map stored in the map database 6 (S3).

Next, the target trajectory generation unit 47 generates a target trajectory (local path (LP)) that takes a trajectory to avoid an obstacle, for example, using the global path formed by the GP generation unit 46 and the obstacle information acquired by the obstacle information acquisition unit 43 (S4). The target trajectory 5 includes a plurality of waypoints 51. The target trajectory 5 has a target trajectory generation time and waypoint information 52 of each of the plurality of waypoints 51.

Next, the reference point setting unit 31 sets a reference point from the plurality of waypoints 51 (S5). The reference point setting processing will be described later.

Next, in S6, the FF twist command value setting unit 32 sets an FF twist command value, and the FB twist command value setting unit 34 sets an FB twist command value, so that a first twist command value is calculated using the set FF twist command value and FB twist command value.

The twist command value setting processing in S6 will be described later.

Next, the movement start or stop compensation speed command value setting unit 35 determines whether each of the first translational speed command value and the first angular speed command value of the first twist command value held by the reference point is a dead band speed or not (S7).

The range of the dead band speed in each of the translational speed and the angular speed is preset. The speed that is in the range smaller than the minimum speed (smallest speed) required for the mobile body 1 to start moving is a dead band speed.

If it is determined in S7 that the first translational speed command value (first angular speed command value) is a dead band speed (YES), the processing proceeds to speed command value setting processing (S8), and the translational speed command value (angular speed command value) of the reference point is changed from the first translational speed command value (first angular speed command value) to the second translational speed command value (second angular speed command value). If the processing in the speed command value setting processing terminates, the processing proceeds to S9.

If it is determined in S7 that the first translational speed command value (first angular speed command value) is not a dead band speed (NO), the first translational speed command value (first angular speed command value) will be directly adopted in the translational speed command value (angular speed command value) of the reference point, and the processing proceeds to S9.

The speed command value setting processing of S8 will be described later.

In S9, the twist command value determination unit 36 determines a final twist command value (translational speed command value and angular speed command value) of the reference point.

In S10, the drive unit control signal generation unit 37 generates a control signal for the drive unit 82 by using the final twist command value determined in S9.

The drive unit 82 of the moving mechanism 8 is controlled on the basis of the generated control signal, so that the movement of the mobile body 1 is controlled.

Reference Point Setting Processing

The reference point setting processing by the reference point setting unit 31 will be described with reference to FIGS. 4 and 7.

Figure 4:
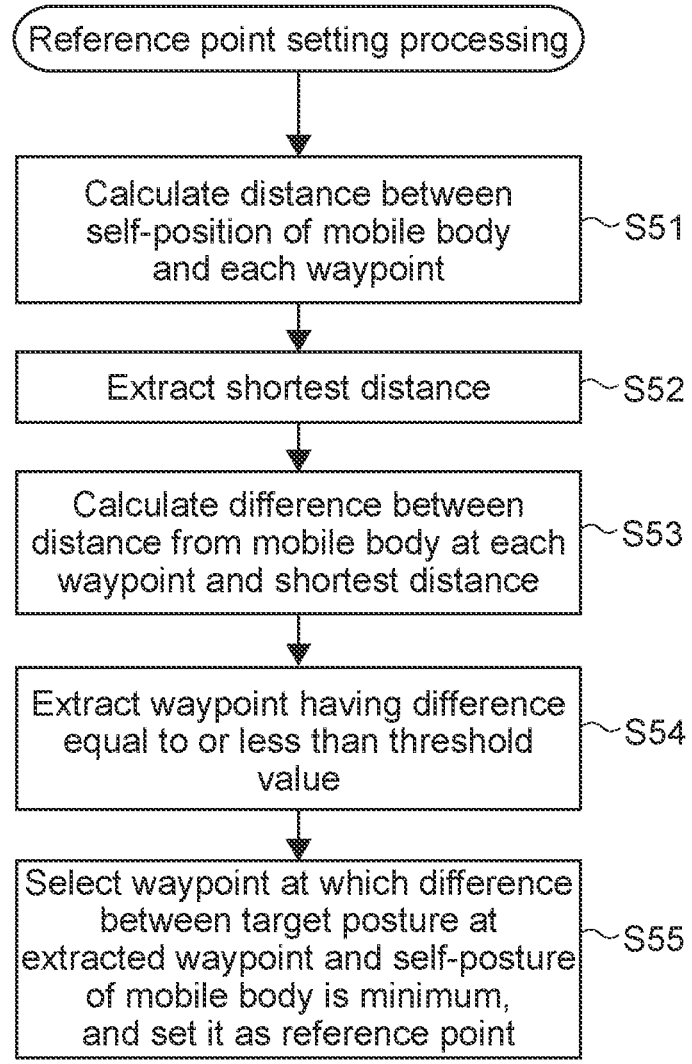
FIG. 4 is a flowchart for describing reference point setting processing.

FIG. 4 is a flowchart of the reference point setting processing.

Figure 7:
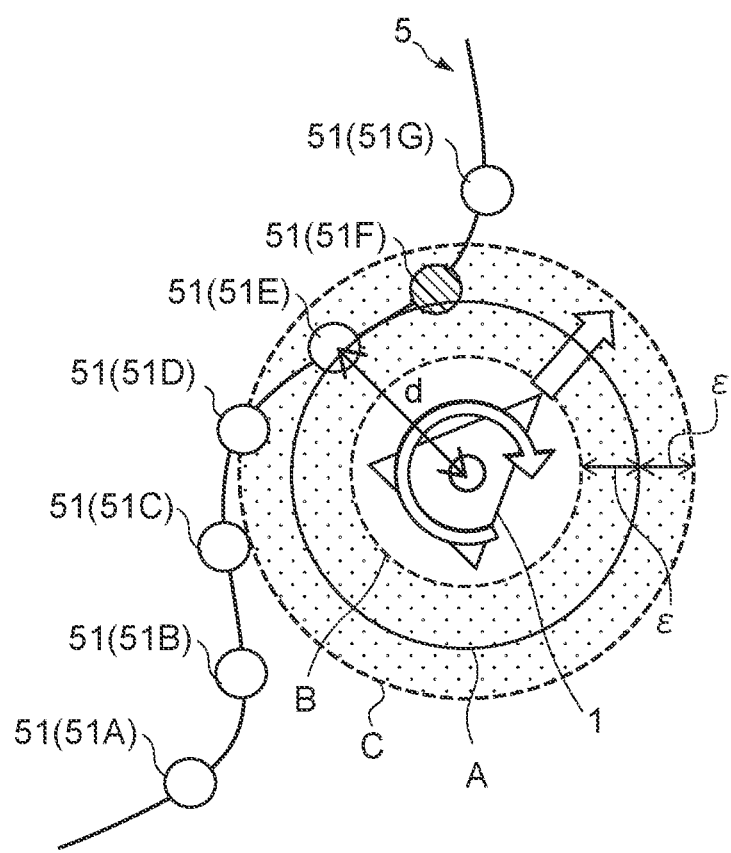
FIG. 7 is a schematic diagram for describing the reference point setting processing.

FIG. 7 is a schematic diagram of a target trajectory and a mobile body for describing the reference point setting. A part of the target trajectory 5 is shown in FIG. 7, where the target trajectory 5 includes a plurality of waypoints 51A to 51G. In the case shown in FIG. 7, the target trajectory 5 of the mobile body 1 is planned to pass through the waypoints in the order of 51A, 51B, 51C, 51D, 51E, 51F, and 51G. In FIG. 7, the reference numerals of 51A to 51G are provided to the plurality of waypoints 51 so as to be distinguished from one another. If there is no need to particularly distinguish the individual waypoints from one another, the waypoints may be described as waypoint(s) 51, and the same applies to the following other figures. In the figure, the waypoint set as the reference point is indicated with oblique lines.

As shown in FIG. 4, when the reference point setting processing starts, the reference point setting unit 31 calculates the distance between the waypoint 51 and the mobile body 1 at all of the plurality of waypoints 51 forming the target trajectory 5 by using the information of the position command value of the waypoint 51 and the self-position information of the mobile body 1 acquired by the self-position and posture information acquisition unit 42 (S51). In the example shown in FIG. 7, the distance from the mobile body 1 is calculated at each of the seven waypoints 51.

Next, the reference point setting unit 31 extracts a waypoint 51 at the shortest distance among the distances between the respective waypoints 51 and the mobile body 1 calculated in S51 (S52). In the example shown in FIG. 7, the waypoint at the shortest distance or the waypoint located closest to the mobile body 1, i.e., the waypoint 51E that is the nearest waypoint is extracted. The distance between the waypoint 51E, which is the nearest point, and the mobile body 1 is denoted by d. Further, in FIG. 7, a virtual circle A indicated by a solid line is a circle passing through the waypoint 51A, which is the nearest point centered on the mobile body 1.

Next, the reference point setting unit 31 calculates a difference between the distance between the waypoint 51 and the mobile body 1 calculated for each of the plurality of waypoints 51, and the shortest distance d (S53), and extracts a waypoint 51 in which such a difference is equal to or less than a threshold value ε (S54).

In FIG. 7, a concentric circle of the virtual circle A, which has a radius smaller by ε than the radius of the virtual circle A passing through the waypoint 51A as the nearest neighbor point, is assumed as a virtual circle B (shown in broken lines), and a concentric circle of the virtual circle A, which has a radius larger by ε than the radius of the virtual circle A, is assumed as a virtual circle C (shown in broken lines). In S54, the waypoint 51D, the waypoint 51E, and the waypoint 51F, which are located in the area indicated by the dots and surrounded by the circumference of the virtual circle B and the circumference of the virtual circle C, are extracted.

Note that in this embodiment the threshold value ε, which is the difference between the radii of the virtual circle A and the virtual circle B, and the threshold value ε, which is the difference between the radii of the virtual circle A and the virtual circle C, are the same values, but threshold values mutually different in magnitude may be set inside and outside the virtual circle A.

The threshold value ε is set using at least one of the information of the target trajectory such as the curvature of the target trajectory, the speed information, the shape information, or the size information of the mobile body 1. Further, the threshold value ε may be set in consideration of the ground state or the like.

In this embodiment, the threshold value ε is set in advance to a numerical value fixed by the user, but the present technology is not limited thereto. The threshold value may be configured to be variable, and may be calculated in accordance with the situation of the target trajectory 5, the mobile body 1, or the like, for example, the curvature of the target trajectory 5 that may change with time, the speed information of the mobile body 1, and a ground situation.

In such a manner, according to the flow of S51 to S54, the waypoints 51 existing within the threshold distance from the mobile body 1 are extracted from the plurality of waypoints 51 using the current position information of the mobile body 1 and the position command value of each waypoint.

Next, the reference point setting unit 31 selects, from the waypoints 51 extracted in S54, a waypoint at which the difference between the posture command value of each waypoint 51 and the current posture of the mobile body 1 acquired by the self-position and posture information acquisition unit 42 is minimum, and sets such a waypoint as a reference point (S55).

In the example shown in FIG. 7, the waypoint 51F having a posture command value with the smallest difference from the posture of the mobile body 1 is selected from the three waypoints 51D, 51E, and 51F extracted in S54, and is set as the reference point.

Twist Command Value Setting Processing

The twist command value setting processing will be described with reference to FIGS. 3 and 5.

Figure 5:
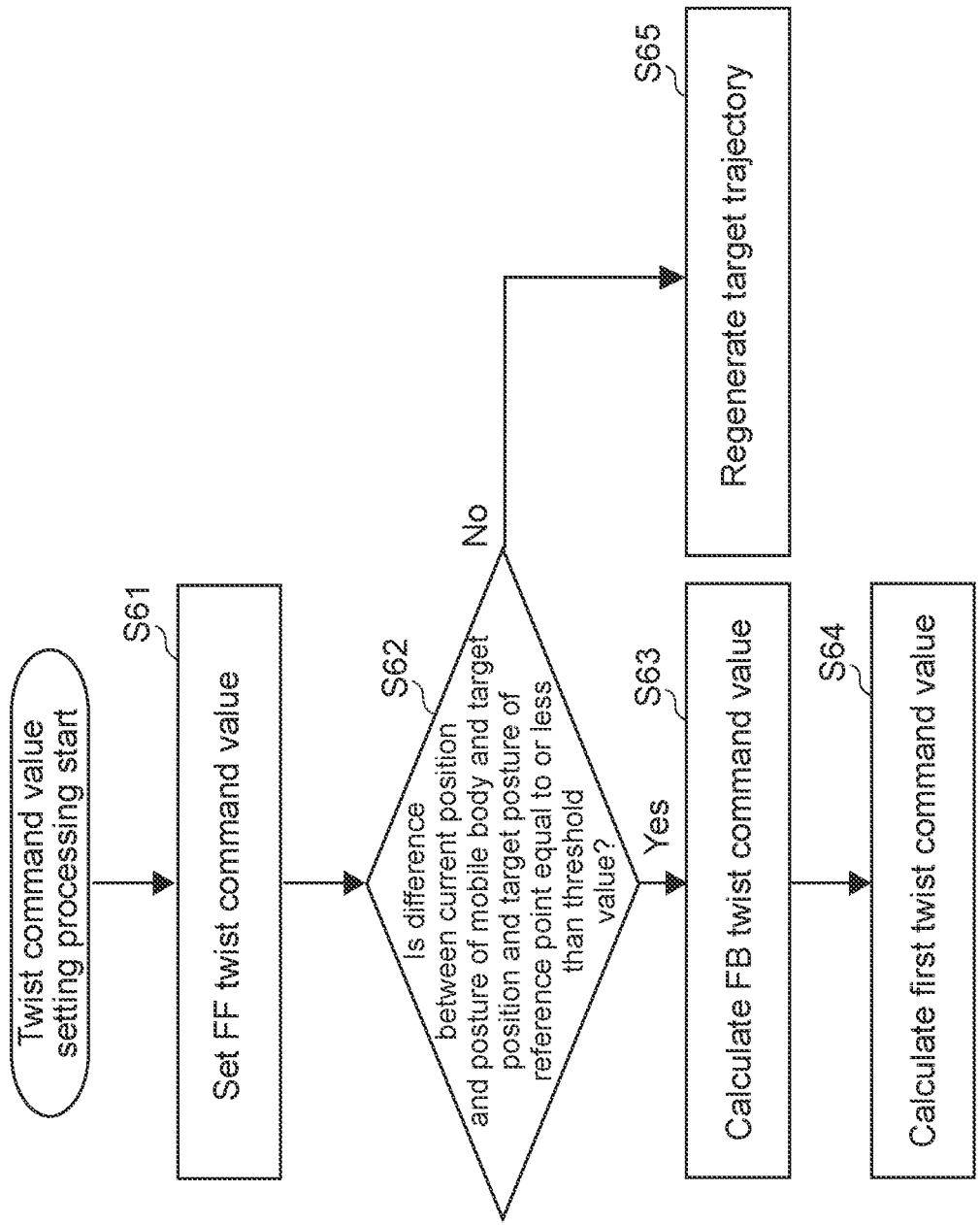
FIG. 5 is a flowchart for describing twist command value setting processing.

FIG. 5 is a flowchart of the twist command value setting processing.

As shown in FIG. 5, the FF twist command value setting unit 32 sets an FF twist command value (S61). More specifically, the FF twist command value setting unit 32 sets, as an FF twist command value, a twist command value including a set of a translational speed command value and an angular speed command value originally held by the reference point.

Next, the FB twist command value setting unit 34 determines whether the error amount between the self-position and posture information of the mobile body 1 acquired by the self-position and posture information acquisition unit 42 and the position command value and posture command value of the reference point is equal to or less than a threshold value (S62).

If it is determined that the error amount is equal to or less than the threshold value (YES), the processing proceeds to S63, and if it is determined that the error amount is larger than the threshold value (NO), the processing proceeds to S65. In S65, the target trajectory is regenerated again by the target trajectory generation unit 47.

In S63, the FB twist command value setting unit 34 calculates an FB translational speed command value and an FB angular speed command value, which are correction values for correction so as to cancel the difference between the self-position and posture of the mobile body 1 acquired by the self-position and posture information acquisition unit 42 and the position command value and posture command value of the reference point. The set of the FB translational speed command value and the FB angular speed command value constitutes an FB twist command value.

Next, the movement start or stop compensation speed command value setting unit 35 calculates, using the FF twist command value set in S61 and the FB twist command value set in S63, a first twist command value (first translational speed command value and first angular speed command value) as a new twist command value of the reference point (S64).

Speed Command Value Setting Processing

The speed command value setting processing will be described with reference to FIGS. 3 and 6.

Figure 6:
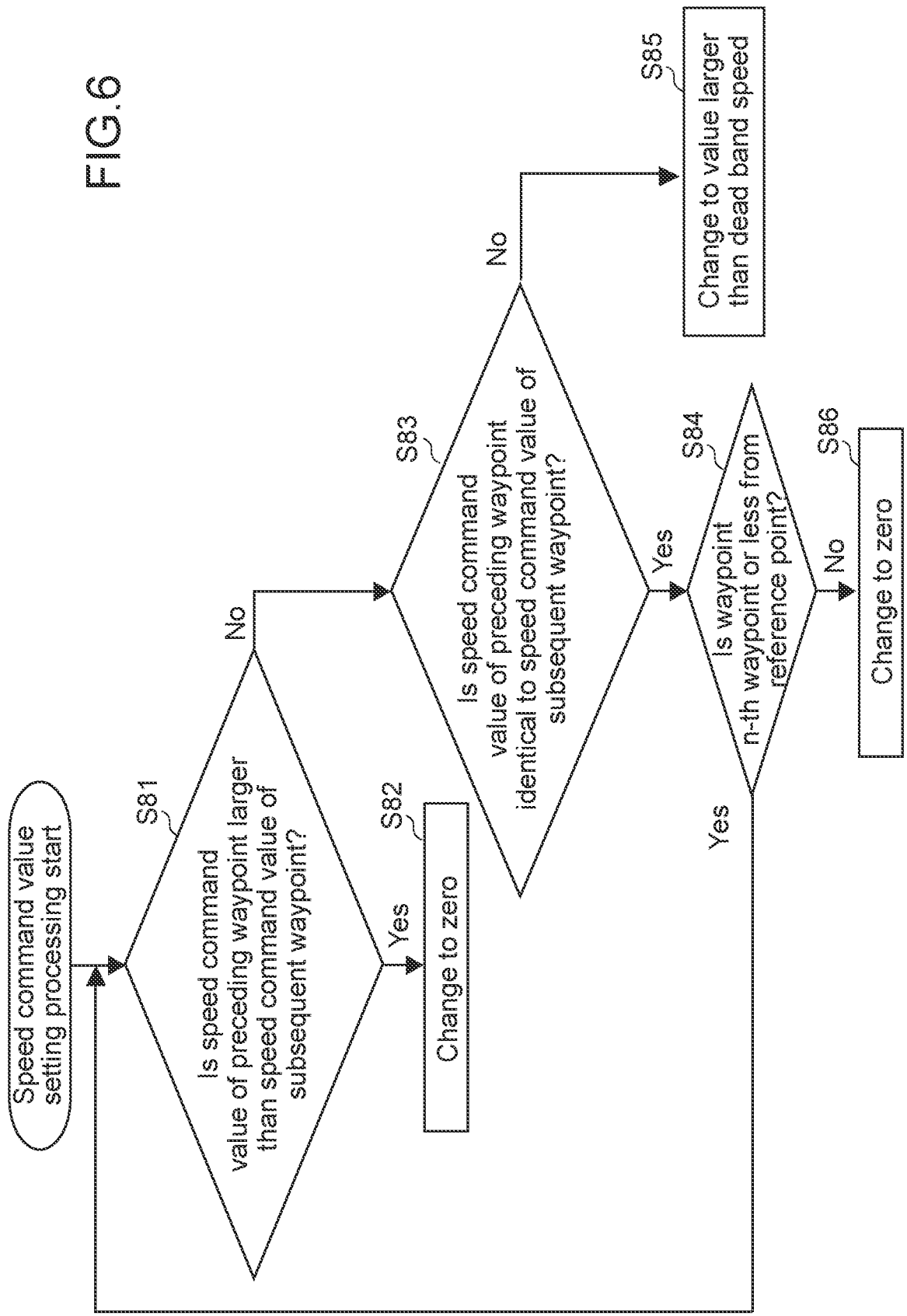
FIG. 6 is a flowchart for describing speed command value setting processing.

FIG. 6 is a flowchart of the speed command value setting processing.

The processing shown in FIG. 6 is performed in each of translational speed command value setting and angular speed command value setting. The "speed command value" to be described below and in FIG. 6 represents a translational speed command value or an angular speed command value. When a preceding waypoint is the reference point, the "speed command value" corresponds to the first speed command value (first translational speed command value or first angular speed command value).

As shown in FIG. 3, the movement start or stop compensation speed command value setting unit 35 determines whether each of the first translational speed command value and the first angular speed command value set in S6 is a dead band speed or not (S7).

If it is determined in S7 that it is a dead band speed (YES), the processing proceeds to the speed command value setting processing (S8).

As shown in FIG. 6, when the speed command value setting processing starts, the movement start or stop compensation speed command value setting unit 35 compares the first speed command value of the reference point with the speed command value of a subsequent waypoint. Specifically, it is determined whether or not the first speed command value of the reference point is larger than the speed command value of a subsequent waypoint (S81).

In other words, in S81, it is determined whether or not the speed command value of the preceding waypoint in the two adjacent waypoints is larger than the speed command value of the subsequent waypoint. Here, the "preceding waypoint" indicates the waypoint having the earlier target passing time in the two adjacent waypoints. The two adjacent waypoints will be referred to as the "preceding waypoint" and the "subsequent waypoint".

If the movement start or stop compensation speed command value setting unit 35 determines in S81 that the first speed command value of the reference point is larger than the speed command value of the subsequent waypoint (YES), the processing proceeds to S82.

In S82, the speed command value of the reference point is changed and set to a second speed command value of zero. The second speed command value is a second translational speed command value or a second angular speed command value.

If the movement start or stop compensation speed command value setting unit 35 determines in S81 that the first speed command value of the reference point is not larger than the speed command value of the subsequent waypoint (NO), the processing proceeds to S83.

In S83, the movement start or stop compensation speed command value setting unit 35 determines whether or not the first speed command value of the reference point is identical to the speed command value of the subsequent waypoint.

In other words, in S83, the speed command value of the preceding waypoint in the two adjacent waypoints is compared with the speed command value of the subsequent waypoint, and it is determined whether or not they are identical to each other.

If it is determined in S83 that those speed command values are not identical to each other (NO), the processing proceeds to S85.

In S85, the speed command value of the reference point is set to a value larger than the dead band speed, and in this embodiment, set to a second speed command value of the minimum speed necessary for the mobile body 1 to move.

Note that the fact that it is determined in S83 that those speed command values are not identical to each other indicates that the speed command value of the preceding waypoint is determined to be larger than that of the subsequent waypoint.

If it is determined in S83 that those speed command values are identical to each other (YES), the processing proceeds to S84.

In S84, the movement start or stop compensation speed command value setting unit 35 determines whether or not the subsequent waypoint in the two waypoints to be compared is the n-th waypoint or less from the reference point (n is an integer equal to or larger than 1). The numerical value of n is set in advance. If n is 10, here, n is 1 because the reference point and the subsequent waypoint are compared with each other.

If the subsequent waypoint in the two waypoints to be compared is the n-th waypoint or less from the reference point (n is an integer equal to or larger than 1) in S84 (YES), the processing returns to S81, and the comparison operation is repeated by shifting the two waypoints to be compared one by one to respective subsequent waypoints.

As a result of the comparison operation in S81, if the speed command value of the preceding waypoint in the two adjacent waypoints is larger than the speed command value of the subsequent waypoint, the speed command value at the reference point is changed and set to a second speed command value of zero (S82).

The processing proceeds from S81 to S83. As a result of the comparison operation in S83, if the speed command value of the preceding waypoint in the two adjacent waypoints is smaller than the speed command value of the subsequent waypoint, the speed command value at the reference point is changed and set to a value larger than the dead band speed, e.g., to a second speed command value of the minimum speed necessary for starting the movement of the mobile body 1 (S85).

Further, as a result of the comparison operation in S83, if the speed command values of the two adjacent waypoints are identical to each other, the processing proceeds to S84. If the movement start or stop compensation speed command value setting unit 35 determines in S84 that a subsequent waypoint in the two waypoints to be compared is not the n-th waypoint or less from the reference point (NO), the speed command value at the reference point is changed and set to a second speed command value of zero (S86). If it is determined that the subsequent waypoint is the n-th waypoint or less (YES), the processing returns to S81, and the comparison operation is repeated by shifting the two waypoints to be compared one by one to respective subsequent waypoints.

As described above, the comparison operation of S81 and S83 is performed by sequentially shifting the two waypoints to be compared one by one to respective subsequent waypoints until the speed command values of the two adjacent waypoints differ from each other within the range where n becomes a predetermined value.

Event Examples of Speed Command Value Setting Processing

Event Examples of the speed command value setting processing performed when the first translational speed command value is a dead band speed will be described with reference to FIGS. 6, 7, 8, 9, 10A, 10B and 10C. In the following examples, the translational speed command value is taken as an example of the speed command value, and the minimum translational speed (minimum speed) required for the mobile body 1 to start moving is set to 0.1 m/s.

Each of FIGS. 8, 9, 10A, 10B and 10C shows the target trajectory 5 along which the mobile body 1 moves from right to left on the figure. In the figure, the waypoint set as the reference point is indicated with oblique lines.

First Event Example

Figure 8:
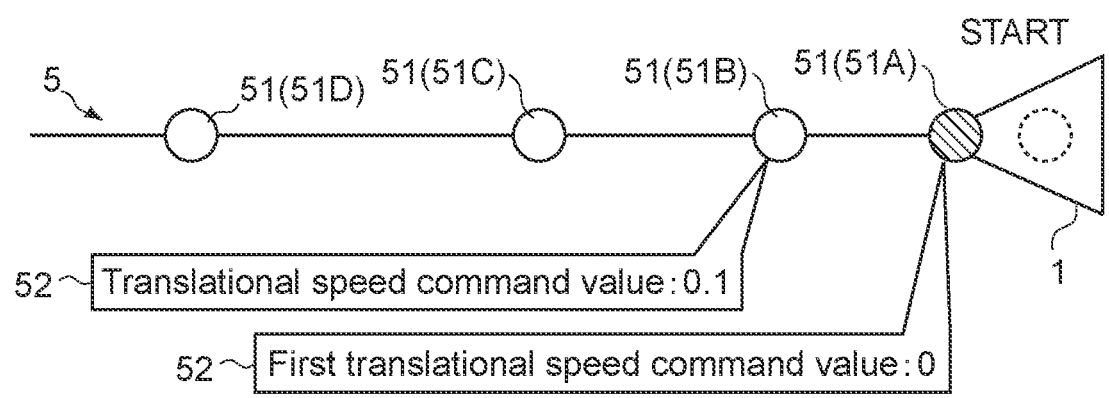
FIG. 8 is a schematic diagram for describing an event example when a speed command value of a reference point is a dead band speed.

FIG. 8 is a schematic diagram for describing a case where the first translational speed command value of the reference point is smaller than the translational speed command value of a subsequent waypoint.

In the example shown in FIG. 8, the target trajectory 5 includes four waypoints 51A to 51D. The waypoint 51A is the starting point of the target trajectory 5 of the mobile body 1. It is assumed that the waypoint 51A is set as a reference point, and the waypoint 51A has a first translational speed command value of 0 m/s. The waypoint 51B is a subsequent waypoint of the waypoint 51A set as the reference point, and has a translational speed command value of 0.1 m/s.

In this example, according to the flow of FIG. 6, as a result of comparing the first translational speed command value of the waypoint 51A as a reference point and the translational speed command value of the waypoint 51B with each other in S81 and S83 described above, the processing proceeds to S85.

In S85, the translational speed command value of the waypoint 51A as a reference point is changed and set to 0.1 m/s (second translational speed command value), which is the minimum value of the translational speed required for starting the movement (hereinafter, sometimes referred to as a threshold value).

Such a second translational speed command value newly set is used to determine the final twist command value of the reference point. The drive unit 82 of the mobile body 1 is driven on the basis of the determined, final twist command value. In this example, the final translational speed command value at the reference point is 0.1 m/s, which is the minimum value required for starting the movement, and thus the mobile body 1 starts to move.

The event shown in FIG. 8 occurs, for example, when the mobile body 1 starts to move from the stopped state. When the mobile body 1 starts to move from the stopped state, the mobile body 1 does not start moving at the translational speed command value of 0 m/s originally held by the waypoint 51A, but the movement start of the mobile body 1 is compensated by changing the translational speed command of the reference point to a translational speed equal to or larger than the threshold value.

Second Event Example

Figure 9:
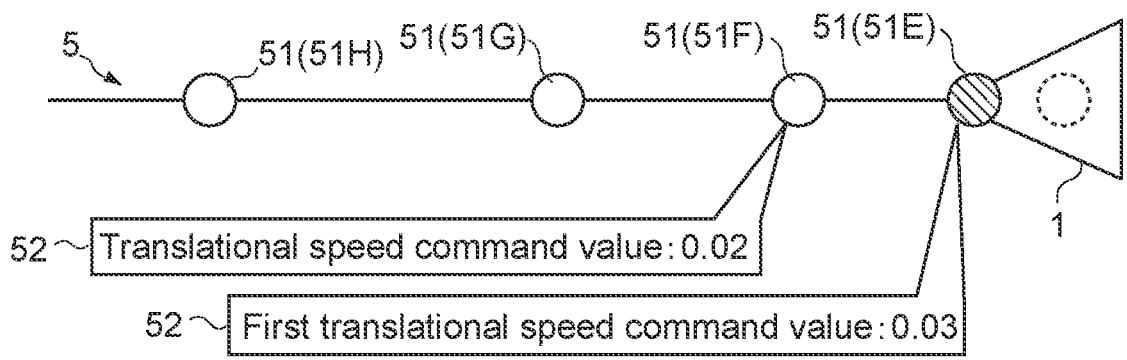
FIG. 9 is a schematic diagram for describing another event example when the speed command value of the reference point is a dead band speed.

FIG. 9 is a schematic diagram for describing a case where the first translational speed command value of the reference point is larger than the translational speed command value of a subsequent waypoint in the adjacent reference point and subsequent waypoint to be compared with each other.

In the example shown in FIG. 9, the target trajectory 5 includes four waypoints 51E to 51H. It is assumed that the waypoint 51E is set as a reference point, the waypoint 51E has a first translational speed command value of 0.03 m/s, and the waypoint 51F has a translational speed command value of 0.02 m/s.

In this example, according to the flow of FIG. 6, as a result of comparing the first translational speed command value of the waypoint 51E and the translational speed command value of the waypoint 51F with each other in S81, the processing proceeds to S82, and the translational speed command value of the waypoint 51E, which is the reference point, is changed and set to 0 m/s (second translational speed command value).

Such a second translational speed command value newly set is used to determine a final twist command value of the reference point. The drive unit 82 of the mobile body 1 is driven on the basis of the determined, final twist command value. In this example, the final translational speed command value of the reference point 0 m/s, and thus the mobile body 1 stops.

The event shown in FIG. 9 occurs, for example, when the mobile body 1 slowly decreases the translational speed and stops. In the translational speed command value around 0.03 m/s before the change, the movement of the mobile body 1 is easily changed depending on the state of the ground surface such as a road surface or a floor surface with which the mobile body 1 comes into contact, the state of the wheels of the mobile body 1, and the weight of the mobile body 1, and the movement of the mobile body 1 becomes unstable. On the other hand, in this embodiment, since the translational speed command value of the waypoint 51E, which is the reference point, is changed and set to zero, the instruction to stop the mobile body 1 is clearly performed.

Third Event Example

Figure 10A:
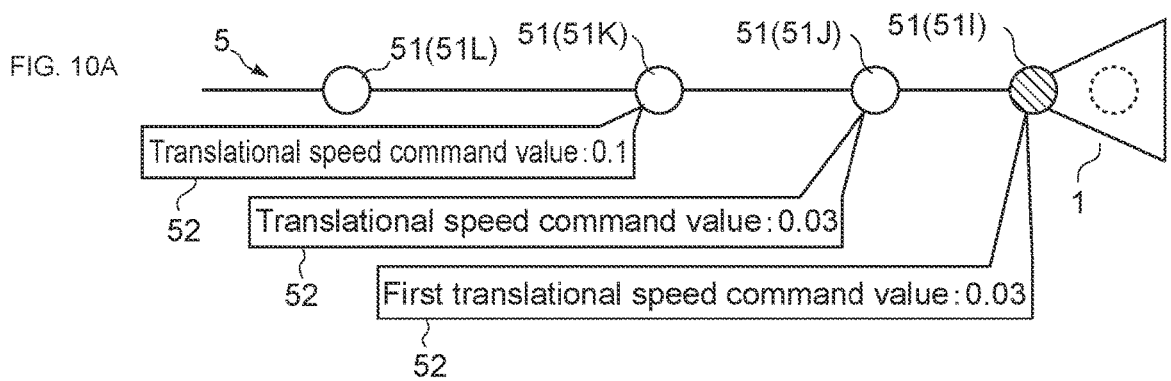
FIGS. 10A, 10B and 10C are schematic diagrams for describing still other event examples when the speed command value of the reference point is a dead band speed.
Figure 10B:
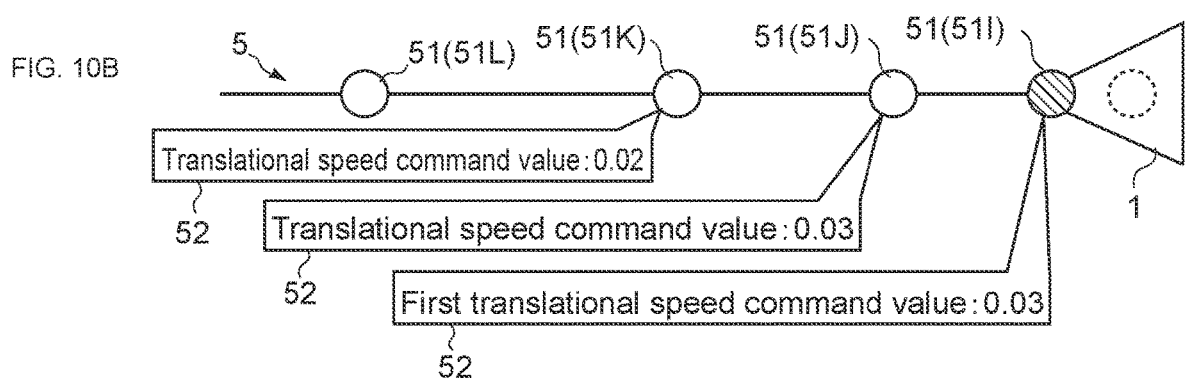
Figure 10C:
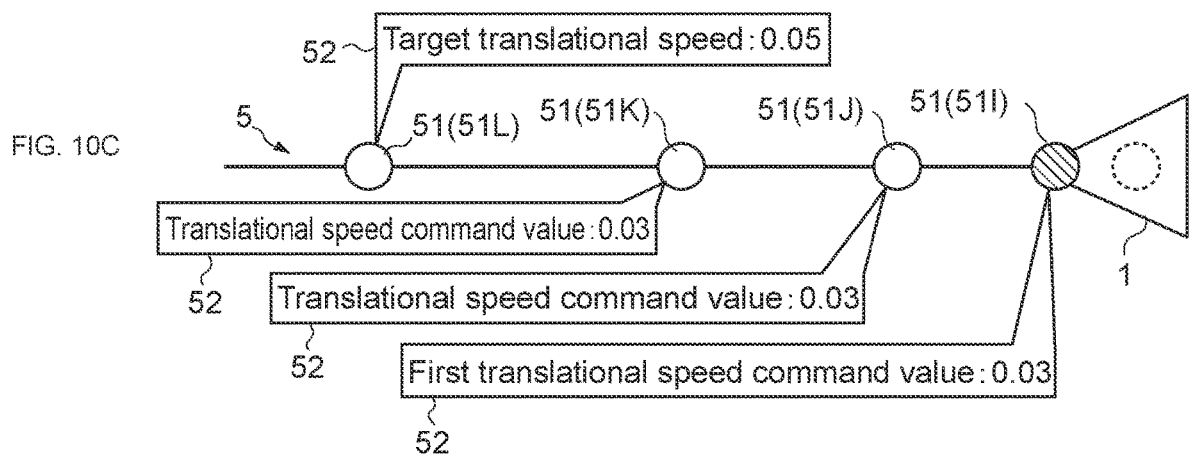

FIGS. 10A, 10B and 10C are schematic diagrams for describing a case where the first translational speed command value of the reference point is identical to the translational speed command value of a subsequent waypoint.

In the examples shown in FIGS. 10A, 10B and 10C, the target trajectory 5 includes four waypoints 51I to 51L. The waypoint 51I is set as a reference point. It is assumed that the waypoint 51I has a first translational speed command value of 0.03 m/s, and the waypoint 51J has a translational speed command value of 0.03 m/s.

In each of the diagrams of FIGS. 10A, 10B and 10C, the translational speed command value command value of the second waypoint 51K from the reference point is different. In the example shown in FIG. 10A, it is assumed that the waypoint 51K has a translational speed command value of 0.1 m/s. In the example shown in FIG. 10B, it is assumed that the waypoint 51K has a translational speed command value of 0.02 m/s. In the example shown in FIG. 10C, it is assumed that the waypoint 51K has a translational speed command value of 0.03 m/s, and the third waypoint 51L from the reference point has a translational speed command value of 0.05 m/s.

In the examples of FIGS. 10A, 10B and 10C, according to the flow of FIG. 6, the first translational speed command value and the translational speed command value of the respective two waypoints 51I and 51J adjacent to each other are compared in S81 and S83. Since the first translational speed command value of the waypoint 51I and the translational speed command value of the waypoint 51J are identical to each other, the processing proceeds to S84.

The waypoint 51J, which is the subsequent waypoint in the two adjacent waypoints to be compared, is the first waypoint from the waypoint 51I set to the reference point. If n in the determination of S84 is set to 10, the subsequent waypoint 51J is located at the ten-th waypoint or less, and thus the processing returns to S81.

Next, in S81, the two adjacent waypoints to be compared are shifted to respective subsequent waypoints, and two adjacent waypoints are compared with each other. In other words, the subsequent waypoint 51J, which is located one waypoint ahead of the reference point and is the first waypoint from the reference point, is compared with the waypoint 51K, which is located one waypoint ahead of the subsequent waypoint 51J and is the second waypoint from the reference point. The waypoint 51K is the second waypoint from the waypoint 51I set as a reference point.

In the example shown in FIG. 10A, since the translational speed command value of the waypoint 51J is smaller than the translational speed command value of the waypoint 51K, the processing proceeds to S81, S83, and S85 in this order. In S85, the translational speed command value of the waypoint 51I, which is the reference point, is changed and set to 0.1 m/s (second translational speed command value), which is the minimum value of the translational speed required for movement start. As a result, the mobile body 1 moves.

In the example shown in FIG. 10B, since the translational speed command value of the waypoint 51J is larger than the translational speed command value of the waypoint 51K, the processing proceeds to S81 and S82 in this order. In S82, the translational speed command value of the waypoint 51I, which is the reference point, is changed and set to 0 m/s (second translational speed command value). As a result, the mobile body 1 stops.

In the example shown in FIG. 10C, since the translational speed command value of the waypoint 51J is identical to the translational speed command value of the waypoint 51K, the processing proceeds to S81, S83, and S84 in this order.

Since the subsequent waypoint 51K in the two adjacent waypoints to be compared is the second waypoint from the reference point, YES is determined in S84, and the processing returns to S81.

Next, in S81, the two adjacent waypoints to be compared are shifted to respective subsequent waypoints, and two adjacent waypoints are compared with each other again. In other words, the waypoint 51K, which is two waypoints ahead of the reference point, and the waypoint 51L, which is three waypoints ahead of the reference point and is located one waypoint ahead of the waypoint 51K, are compared with each other.

In the example shown in FIG. 10C, since the translational speed command value of the waypoint 51K is smaller than the translational speed command value of the waypoint 51L, the processing proceeds to S81, S83, and S85 in this order. In S85, the translational speed command value of the reference point 51I, which is the reference point, is changed and set to 0.1 m/s (second translational speed command value), which is the minimum value of the translational speed required for movement start. As a result, the mobile body 1 moves.

As described with reference to FIGS. 10A, 10B and 10C, in the case where the translational speed command value of the preceding waypoint is identical to the translational speed command value of the subsequent waypoint in the adjacent waypoints, the comparison operation of the translational speed command values is sequentially performed by shifting the two waypoints to be compared one by one to subsequent waypoints. This comparison operation is performed up to a predetermined waypoint until the translational speed command values of the respective adjacent waypoints are different from each other.

The event shown in FIGS. 10A, 10B and 10C occurs, for example, when the mobile body 1 moves slowly at a translational speed less than a threshold value from the stop state or when the mobile body 1 decelerates from a high-speed range and moves slowly at a translational speed less than the threshold value.

As described above, in this embodiment, when the movement of the mobile body 1 at the dead band speed is controlled using the speed command value information of a waypoint located ahead of the reference point, the movement of the mobile body 1 becomes smooth.

Control Using Target Passing Time

In addition to the action control of the mobile body 1 described above, the movement of the mobile body 1 can be controlled using the target passing time. Hereinafter, it will be described below.

If a dead time (response time) occurs from the time when a twist command value including a set of a translational speed command value and an angular speed command value is given to the mobile body 1 to the time when the mobile body 1 starts to respond, a waypoint having a target passing time closest to the sum of the target passing time of the reference point and the dead time (response time) may be selected from the target trajectory 5 and set to a new reference point.

In this case, after the reference point is set through the above-mentioned reference point setting processing (S5) shown in FIG. 3, the reference point setting unit 31 newly sets the reference point in consideration of the dead time (response time). Subsequently, the processing of S6 and subsequent steps shown in FIG. 3 is performed on the basis of the newly set reference point. The dead time (response time) is measured and set in advance.

This makes it possible to reduce the influence of the dead time on the trajectory tracking of the mobile body 1, thus allowing a smoother movement of the mobile body 1. Further, in consideration of the dead time, for example, it is possible to suppress the occurrence of problems, e.g., the mobile body does not pass through the waypoint at a target passing time punctually and collides with a wall by moving at a speed different from the speed intended in situ.

As described above, according to the present technology, the reference point is appropriately selected using the current posture information of the mobile body in addition to the waypoint information of the waypoint, and the movement of the mobile body is controlled using the waypoint information of the reference point, so that a smooth movement of the mobile body becomes possible. For example, even if the target posture at the nearest point and the current posture of the mobile body are greatly different from each other, the reference point for controlling the movement of the mobile body is appropriately selected using the posture information in the present technology, and thus a smooth movement of the mobile body can be achieved.

Furthermore, in addition to the selection of an appropriate reference point, the twist command setting processing in consideration of the dead band speed of the mobile body is performed, so that it is possible to reliably perform the movement start and stop of the mobile body.

Furthermore, the reference point is reset in consideration of the dead time, so that it is possible to make the tracking to the target trajectory more reliable.

The present technology can be used for general mobile bodies such as robots that operate using waypoints. For example, it can be applied to mobile bodies such as a two-wheeled differential robot, a four-wheeled vehicle, a multi-legged robot, a drone that moves in a three-dimensional space, a robot arm, a boom or arm of an excavator, and a boom of a crane. By using the present technology, the movement of the mobile body in the phase of movement start, the phase during the movement, and the phase of stop of the mobile body relating to the tracking of the target trajectory is controlled.

The embodiment of the present technology is not limited to the embodiment described above, and various modifications can be made without departing from the gist of the present technology.

For example, in the embodiment described above, the example has been described in which the arithmetic unit 10 that performs a series of processes for controlling the movement of the mobile body 1 is mounted on the mobile body 1, and the mobile body 1 functions as an information processing apparatus, but the present technology is not limited thereto.

For example, the arithmetic unit 10 may be provided on a cloud server or another device. In this case, the cloud server or the other device may be used as an information processing apparatus, and the information processing apparatus and the mobile body may be configured to be able to communicate with each other.

In addition, a part of the arithmetic unit 10 may be located on the cloud server or in another device, and the other part may be located in the mobile body 1.

In addition, the example in which the map database 6 and the storage unit 7 are mounted on the mobile body 1 has been described, but the present technology is not limited thereto. The map database 6 and the storage unit 7 may be provided on a cloud server or in other devices.

Further, the waypoint may be a physically recognizable marker that is previously installed or drawn in the field where the mobile body 1 operates. The marker includes a position command value and a posture command value for the mobile body, and a target trajectory including a plurality of waypoints is generated using the plurality of markers as waypoints. Further, in the case of a mobile body moving in a three-dimensional space, a marker or the like disposed or drawn three-dimensionally may be used. In this case as well, the marker includes the waypoint information including the position command value and the posture command value, and a target trajectory including a plurality of waypoints is generated by using the plurality of markers as waypoints.

Note that the present technology may take the following configurations.

(1) An information processing apparatus, including:
a position information acquisition unit that acquires position information of a mobile body;
a posture information acquisition unit that acquires posture information of the mobile body;
a generation unit that generates a target trajectory including a plurality of waypoints each including waypoint information including a position command value and a posture command value for the mobile body; and
a mobile body controller that
extracts, from the plurality of waypoints, waypoints existing within a threshold distance from the mobile body using the position information and the position command value,
selects, from the extracted waypoints, a waypoint having a smallest difference between the posture command value of the waypoint and the posture information, and
sets the waypoint as a reference point.

(2) The information processing apparatus according to (1), in which
the threshold distance is set using at least one of information of the target trajectory, speed information, shape information, or size information of the mobile body.

(3) The information processing apparatus according to (1) or (2), in which the mobile body controller controls movement of the mobile body using the waypoint information of the waypoint set as the reference point.

(4) The information processing apparatus according to (3), in which
the waypoint information includes a speed command value including at least one of a translational speed command value or an angular speed command value, and
the mobile body controller controls the movement of the mobile body using the speed command value of the waypoint set as the reference point.

(5) The information processing apparatus according to (4), in which
the mobile body controller controls the movement of the mobile body in consideration of an error amount between the position information or the posture information and the position command value or the posture command value of the waypoint set as the reference point.

(6) The information processing apparatus according to (5), in which
the generation unit regenerates the target trajectory when the error amount exceeds a threshold value.

(7) The information processing apparatus according to any one of (4) to (6), in which
the mobile body controller controls the movement of the mobile body using a speed command value of a waypoint located ahead of the reference point if the speed command value of the waypoint set as the reference point is a dead band speed.

(8) The information processing apparatus according to (7), in which
the mobile body controller changes the speed command value of the waypoint set as the reference point on the basis of a result of comparing the speed command value of the waypoint set as the reference point and a speed command value of a subsequent waypoint.

(9) The information processing apparatus according to (8), in which
the mobile body controller changes the speed command value of the waypoint set as the reference point to a speed command value larger than the dead band speed if the speed command value of the subsequent waypoint is larger than the speed command value of the waypoint set as the reference point.

(10) The information processing apparatus according to (8), in which
the mobile body controller changes the speed command value of the waypoint set as the reference point to zero if the speed command value of the subsequent waypoint is smaller than the speed command value of the waypoint set as the reference point.

(11) The information processing apparatus according to (8), in which
the mobile body controller sequentially compares, if the speed command value of the waypoint set as the reference point is identical to the speed command value of the subsequent waypoint, two adjacent waypoints to be compared by shifting the two adjacent waypoints one by one to subsequent waypoints until speed command values of the respective two adjacent waypoints to be compared differ from each other.

(12) The information processing apparatus according to (11), in which
the mobile body controller changes the speed command value of the waypoint set as the reference point to zero if a speed command value of a preceding waypoint is larger than a speed command value of a subsequent waypoint in the two adjacent waypoints to be compared as a result of the sequential comparison.

(13) The information processing apparatus according to (11), in which
the mobile body controller changes the speed command value of the waypoint set as the reference point to a speed command value larger than the dead band speed if a speed command value of a preceding waypoint is smaller than a speed command value of a subsequent waypoint in the two adjacent waypoints to be compared as a result of the sequential comparison.

(14) The information processing apparatus according to (11), in which
the mobile body controller changes the speed command value of the waypoint set as the reference point to zero if the speed command values of the two adjacent waypoints are constantly identical to each other as a result of the sequential comparison performed to a predetermined waypoint.

(15) The information processing apparatus according to any one of (4) to (14), in which
the waypoint information includes a target passing time at which the mobile body passes through a waypoint, and
the mobile body controller sets, as a new reference point, a waypoint having a target passing time that is closest to a sum of a target passing time of the waypoint set as the reference point and a response time for the speed command value of the mobile body.

(16) The information processing apparatus according to any one of (1) to (15), in which
the mobile body includes
the position information acquisition unit,
the posture information acquisition unit,
the generation unit, and
the mobile body controller.

(17) An information processing method, including:
acquiring position information of a mobile body;
acquiring posture information of the mobile body;
generating a target trajectory including a plurality of waypoints each including waypoint information including a position command value and a posture command value for the mobile body; and
extracting, from the plurality of waypoints, waypoints existing within a threshold distance from the mobile body using the position information and the position command value, selecting, from the extracted waypoints, a waypoint having a smallest difference between the posture command value of the waypoint and the posture information, and setting the waypoint as a reference point.

(18) A program causing an information processing apparatus to execute processing including the steps of:
acquiring position information of a mobile body;
acquiring posture information of the mobile body;
generating a target trajectory including a plurality of waypoints each including waypoint information including a position command value and a posture command value for the mobile body; and
extracting, from the plurality of waypoints, waypoints existing within a threshold distance from the mobile body using the position information and the position command value, selecting, from the extracted waypoints, a waypoint having a smallest difference between the posture command value of the waypoint and the posture information, and setting the waypoint as a reference point.

REFERENCE SIGNS LIST 1 mobile body (information processing apparatus)
3 action control unit (mobile body controller)
5 target trajectory
42 self-position and posture information acquisition unit (position information acquisition unit, posture information acquisition unit)
47 target trajectory generation unit (generation unit)
51 waypoint
52 waypoint information

The invention claimed is:

1. An information processing apparatus, comprising:
a position information acquisition unit configured to acquire position information of a mobile body;
a posture information acquisition unit configured to acquire posture information of the mobile body;
a generation unit configured to generate a target trajectory including a plurality of waypoints each including waypoint information including a position command value and a posture command value for the mobile body; and
a mobile body controller configured to
extract, from the plurality of waypoints, waypoints existing within a threshold distance from the mobile body using the position information and the position command value,
select, from the extracted waypoints, a waypoint having a smallest difference between the posture command value of the waypoint and the posture information, set the waypoint as a reference point, and
control movement of the mobile body using the waypoint information of the waypoint set as the reference point.

2. The information processing apparatus according to claim 1, wherein
the threshold distance is set using at least one of information of the target trajectory, speed information, shape information, or size information of the mobile body.

3. The information processing apparatus according to claim 1, wherein
the waypoint information includes a speed command value including at least one of a translational speed command value or an angular speed command value, and
the mobile body controller is further configured to control the movement of the mobile body using the speed command value of the waypoint set as the reference point.

4. The information processing apparatus according to claim 3, wherein
the mobile body controller is further configured to control the movement of the mobile body in consideration of an error amount between the position information or the posture information and the position command value or the posture command value of the waypoint set as the reference point.

5. The information processing apparatus according to claim 4, wherein
the generation unit is further configured to regenerate the target trajectory when the error amount exceeds a threshold value.

6. The information processing apparatus according to claim 3, wherein
the mobile body controller is further configured to control the movement of the mobile body using a speed command value of a waypoint located ahead of the reference point if the speed command value of the waypoint set as the reference point is a dead band speed.

7. The information processing apparatus according to claim 6, wherein
the mobile body controller is further configured to control the speed command value of the waypoint set as the reference point based on a result of comparing the speed command value of the waypoint set as the reference point and a speed command value of a subsequent waypoint.

8. The information processing apparatus according to claim 7, wherein
the mobile body controller is further configured to control the speed command value of the waypoint set as the reference point to a speed command value larger than the dead band speed if the speed command value of the subsequent waypoint is larger than the speed command value of the waypoint set as the reference point.

9. The information processing apparatus according to claim 7, wherein
the mobile body controller is further configured to sequentially compare, if the speed command value of the waypoint set as the reference point is identical to the speed command value of the subsequent waypoint, two adjacent waypoints to be compared by shifting the two adjacent waypoints one by one to subsequent waypoints until speed command values of the respective two adjacent waypoints to be compared differ from each other.

10. The information processing apparatus according to claim 9, wherein
the mobile body controller is further configured to control the speed command value of the waypoint set as the reference point to zero if a speed command value of a preceding waypoint is larger than a speed command value of a subsequent waypoint in the two adjacent waypoints to be compared as a result of the sequential comparison.

11. The information processing apparatus according to claim 9, wherein
the mobile body controller is further configured to control the speed command value of the waypoint set as the reference point to a speed command value larger than the dead band speed if a speed command value of a preceding waypoint is smaller than a speed command value of a subsequent waypoint in the two adjacent waypoints to be compared as a result of the sequential comparison.

12. The information processing apparatus according to claim 9, wherein
the mobile body controller is further configured to control the speed command value of the waypoint set as the reference point to zero if the speed command values of the two adjacent waypoints are constantly identical to each other as a result of the sequential comparison performed to a specific waypoint.

13. The information processing apparatus according to claim 7, wherein
the mobile body controller is further configured to control the speed command value of the waypoint set as the reference point to zero if the speed command value of the subsequent waypoint is smaller than the speed command value of the waypoint set as the reference point.

14. The information processing apparatus according to claim 3, wherein
the waypoint information includes a target passing time at which the mobile body passes through a waypoint, and
the mobile body controller is further configured to set, as a new reference point, a waypoint having a target passing time that is closest to a sum of a target passing time of the waypoint set as the reference point and a response time for the speed command value of the mobile body.

15. The information processing apparatus according to claim 1, wherein
the mobile body includes
the position information acquisition unit,
the posture information acquisition unit, and
the generation unit.

16. An information processing method, comprising:
acquiring position information of a mobile body;
acquiring posture information of the mobile body;
generating a target trajectory including a plurality of waypoints each including waypoint information including a position command value and a posture command value for the mobile body;
extracting, from the plurality of waypoints, waypoints existing within a threshold distance from the mobile body using the position information and the position command value;
selecting, from the extracted waypoints, a waypoint having a smallest difference between the posture command value of the waypoint and the posture information;
setting the waypoint as a reference point; and
controlling movement of the mobile body using the waypoint information of the waypoint set as the reference point.

17. A non-transitory computer-readable medium having stored thereon, computer-executable instructions which, when executed by a computer, cause the computer to execute operations, the operations comprising:
acquiring position information of a mobile body;
acquiring posture information of the mobile body;
generating a target trajectory including a plurality of waypoints each including waypoint information including a position command value and a posture command value for the mobile body;
extracting, from the plurality of waypoints, waypoints existing within a threshold distance from the mobile body using the position information and the position command value;
selecting, from the extracted waypoints, a waypoint having a smallest difference between the posture command value of the waypoint and the posture information;
setting the waypoint as a reference point; and
controlling movement of the mobile body using the waypoint information of the waypoint set as the reference point.

* * * * *